(12) United States Patent
Shigematsu

(10) Patent No.: US 12,154,707 B2
(45) Date of Patent: Nov. 26, 2024

(54) ELECTRONIC COMPONENT

(71) Applicant: Murata Manufacturing Co., Ltd., Nagaokakyo (JP)

(72) Inventor: Satoshi Shigematsu, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 655 days.

(21) Appl. No.: 17/518,668

(22) Filed: Nov. 4, 2021

(65) Prior Publication Data
US 2022/0059271 A1   Feb. 24, 2022

Related U.S. Application Data

(63) Continuation of application No. PCT/JP2021/006732, filed on Feb. 24, 2021.

(30) Foreign Application Priority Data

Apr. 20, 2020 (JP) ................. 2020-074677

(51) Int. Cl.
H01F 27/00 (2006.01)
H01F 27/24 (2006.01)

(52) U.S. Cl.
CPC .......... *H01F 27/004* (2013.01); *H01F 27/24* (2013.01)

(58) Field of Classification Search
CPC .... H01F 27/004; H01F 27/24; H01F 27/2804; H01F 27/2809
USPC ................................ 336/142, 200
See application file for complete search history.

(56) References Cited

U.S. PATENT DOCUMENTS

| | | | |
|---|---|---|---|
| 2013/0062994 A1 | 3/2013 | Ogawa et al. | |
| 2015/0109074 A1* | 4/2015 | Son ...................... | H03H 7/0115 333/185 |
| 2015/0116966 A1 | 4/2015 | Lee et al. | |
| 2015/0213960 A1* | 7/2015 | Moon .................... | H01G 4/40 361/270 |

(Continued)

FOREIGN PATENT DOCUMENTS

| | | |
|---|---|---|
| JP | 11-340039 A | 12/1999 |
| JP | 2012-199353 A | 10/2012 |
| JP | 2015-088720 A | 5/2015 |

OTHER PUBLICATIONS

Official Communication issued in International Patent Application No. PCT/JP2021/006732, mailed on May 11, 2021.

*Primary Examiner* — Shawki S Ismail
(74) *Attorney, Agent, or Firm* — Keating & Bennett, LLP

(57) ABSTRACT

An electronic component includes a multilayer body including first and second principal surfaces opposite to each other in a stacking direction and including long sides and short sides, capacitor electrodes defining capacitors, coil conductors including a winding axis parallel or substantially parallel to the stacking direction and defining inductors, terminal electrodes connected to the coil conductors and the capacitor electrodes, and dummy electrodes not connected to the terminal electrodes and extending along the long sides of the multilayer body. The coil conductors are closer to the first principal surface than the capacitor electrodes in the stacking direction. The dummy electrodes are closer to the first principal surface than the coil conductors. The dummy electrodes do not overlap the coil opening of the coil conductors when viewed in the stacking direction.

14 Claims, 10 Drawing Sheets

(56) References Cited

U.S. PATENT DOCUMENTS

2016/0142033 A1\* 5/2016 Chong .................... H01G 4/35
                                                                       333/185
2022/0028597 A1\* 1/2022 Kobayashi .......... H01F 27/2804

\* cited by examiner

ELECTRONIC COMPONENT

CROSS REFERENCE TO RELATED APPLICATIONS

This application claims the benefit of priority to Japanese Patent Application No. 2020-074677 filed on Apr. 20, 2020 and is a Continuation Application of PCT Application No. PCT/JP2021/006732 filed on Feb. 24, 2021. The entire contents of each application are hereby incorporated herein by reference.

BACKGROUND OF THE INVENTION

1. Field of the Invention

The present invention relates to an electronic component including inductors and capacitors in a multilayer body including base layers.

2. Description of the Related Art

In the related art, an electronic component, in which coil conductors and capacitor electrodes are disposed in a multilayer body having base layers, acts as an LC filter.

For example, Japanese Unexamined Patent Application Publication No. 11-340039 describes a filter device in which an inductor and capacitors are formed in a multilayer body obtained by stacking base layers.

In the filter device described in Japanese Unexamined Patent Application Publication No. 11-340039, conductive patterns, forming an inductor, and electrodes, forming capacitors, are disposed so as to overlap each other when viewed in the stacking direction of the base layers. The electrodes, forming capacitors, expand in the layer direction in order to increase the area in which the electrodes are opposite to each other. In contrast, the conductive patterns, forming an inductor, have a thin line width in order to make the line length longer. Typically, multiple electrodes, forming capacitors, are formed so as to have a fine gap in the stacking direction for the generation of capacitance between the layers in the stacking direction of the multilayer body. In contrast, the conductive patterns, forming an inductor, may have wide conductor gaps in the stacking direction so as not to generate unnecessary stray capacitance between the layers. These structures make the conductor density different between the capacitor-formed layers and the inductor-formed layers in the multilayer body.

Thus, when the conductor density varies in the stacking direction of the multilayer body, a difference in shrinkage ratio between the base layers occurs in accordance with the conductor density during firing of the multilayer body. That is, the shrinkage ratio of a "sparse" conductor-density area is higher than that of a "dense" conductor-density area. That is, inductor-formed layers shrink much more than capacitor-formed layers. Thus, the multilayer body warps in the direction toward the inductor-formed layers.

According to Japanese Unexamined Patent Application Publication No. 11-34003, "shield-electrode conductor layers" are formed so that "internal-electrode conductor layers", which form an inductor and capacitors, are interposed therebetween in the stacking direction, causing the imbalance of conductor density to be somewhat avoided. However, the "shield-electrode conductor layers" block magnetic flux generated by the inductor, causing the shield-electrode conductor layers to degrade the Q value of the inductor.

SUMMARY OF THE INVENTION

Preferred embodiments of the present invention provide electronic components which are each free from warpage caused by an imbalance of conductor density and also free from degradation of a Q value of an inductor.

An electronic component according to a preferred embodiment of the present invention includes a multilayer body. The multilayer body includes a first principal surface and a second principal surface which are opposite to each other in a stacking direction of base layers, and has a rectangular or substantially rectangular parallelepiped shape in which the first principal surface and the second principal surface have a long side and a short side. The electronic component includes capacitor electrodes, coil conductors, terminal electrodes, and at least one dummy electrode. The capacitor electrodes define a capacitor. The coil conductors include the winding axis parallel or substantially parallel to the stacking direction and define an inductor. The terminal electrodes are connected to the coil conductors and the capacitor electrodes. The at least one dummy electrode is not connected to the terminal electrodes and extends along the long side of the multilayer body. The coil conductors are closer to the first principal surface than the capacitor electrodes in the stacking direction. The at least one dummy electrode is closer to the first principal surface than the coil conductors in the stacking direction. The at least one dummy electrode does not overlap a coil opening of the coil conductors when viewed in the stacking direction.

The configuration described above improves the balance of conductor density between an area closer to the first principal surface and an area closer to the second principal surface in the multilayer body. In addition, the dummy electrodes act as strut members during shrinkage of the multilayer body. Further, the dummy electrodes do not block the coil openings of the coil conductors.

Preferred embodiments of the present invention provide electronic components which each reduce or prevent warpage caused by an imbalance of conductor density and which each avoid degradation of the Q values of the inductors.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Preferred embodiments of the present invention will be described in detail below with reference to the accompanying drawings.

Figure 1:
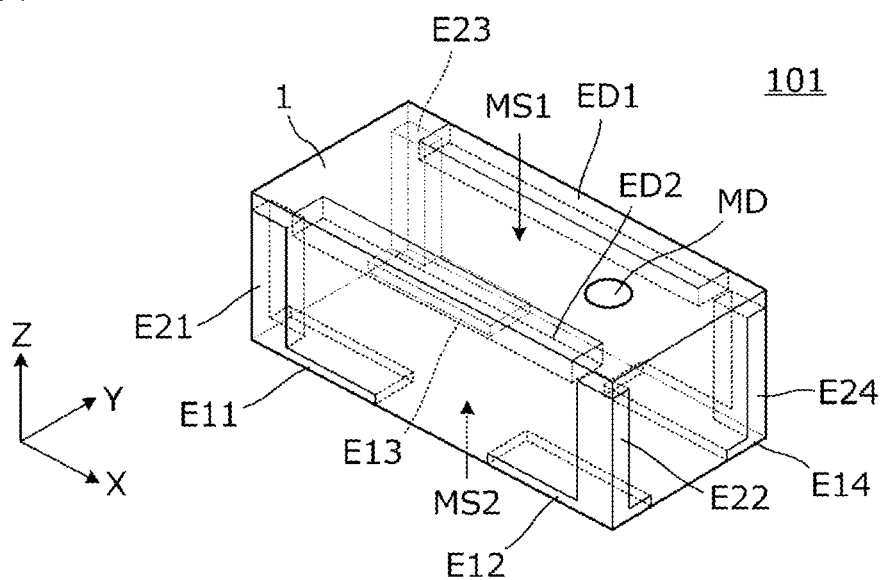
FIG. 1 is a perspective view of an electronic component 101 according to a first preferred embodiment of the present invention.

FIG. 1 is a perspective view of an electronic component 101 according to a first preferred embodiment of the present invention. The electronic component 101 includes a multilayer body 1 which includes a first principal surface MS1 and a second principal surface MS2, which are opposite each other in the stacking direction of multiple base layers described below, and which has a rectangular or substantially rectangular parallelepiped shape in which the first principal surface MS1 and the second principal surface MS2 include long sides and short sides. In FIG. 1, the direction parallel or substantially parallel to the Z axis is the stacking direction; the direction parallel or substantially parallel to the X axis is the long side direction; the direction parallel or substantially parallel to the Y axis is the short side direction.

The multilayer body 1 includes, capacitor electrodes, which define capacitors, and coil conductors, which define inductors and include a winding axis parallel or substantially parallel to the stacking direction of the multilayer body 1, which are described below. However, these are not illustrated in FIG. 1.

The multilayer body 1 includes, on the second principal surface MS2, a first terminal electrode E11, a second terminal electrode E12, a third terminal electrode E13, and a fourth terminal electrode E14, which are connected to the coil conductors and the capacitor electrodes. The multilayer body 1 includes, on the first principal surface MS1, dummy electrodes ED1 and ED2 which are not connected to the terminal electrodes E11, E12, E13, and E14 and which extend along the long sides of the multilayer body 1. A direction identifying mark MD is provided on the first principal surface MS1 of the multilayer body 1.

Figure 2:
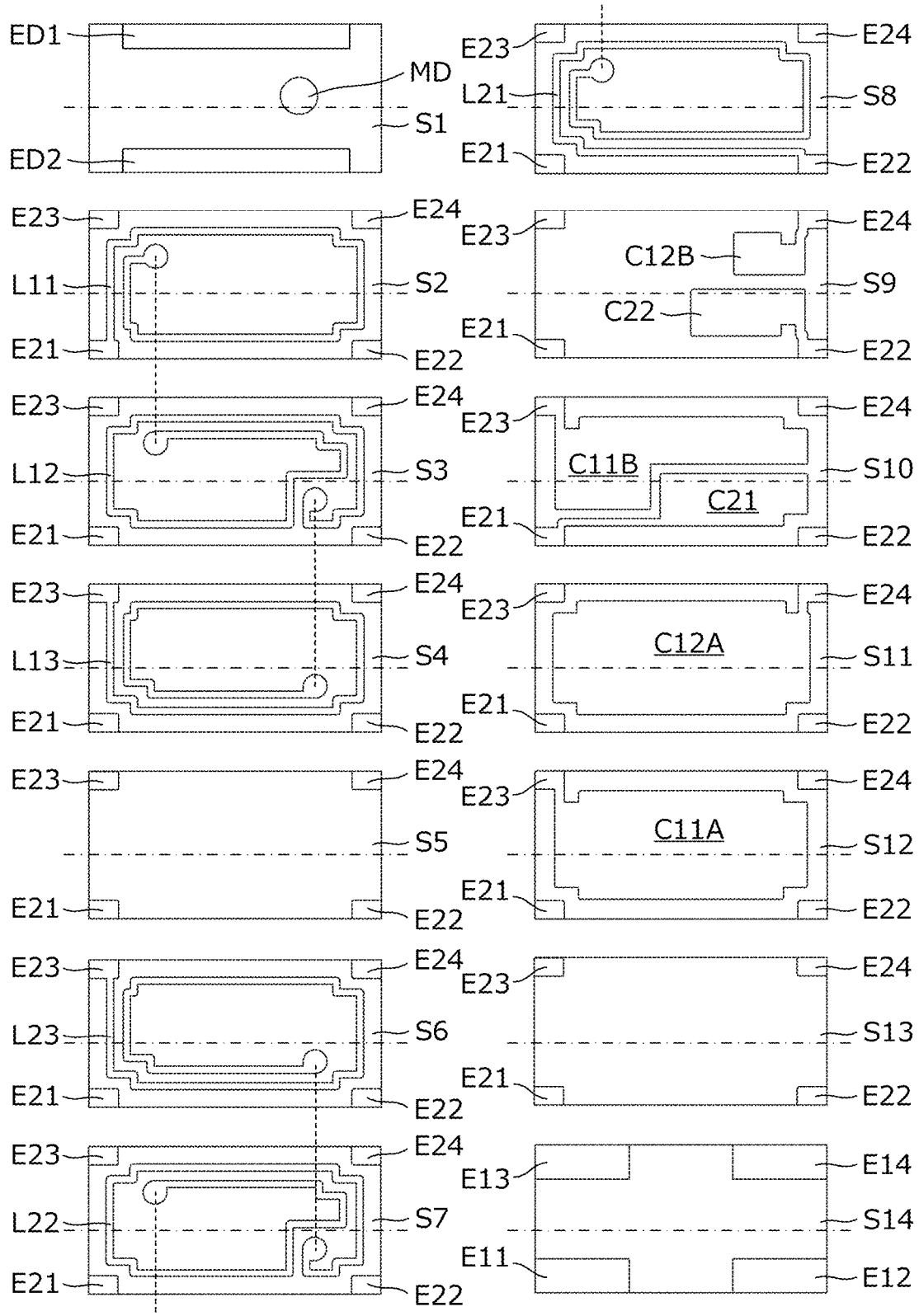
FIG. 2 is an exploded plan view illustrating conductive patterns provided on the insulating base layers of the electronic component 101.
Figure 3:
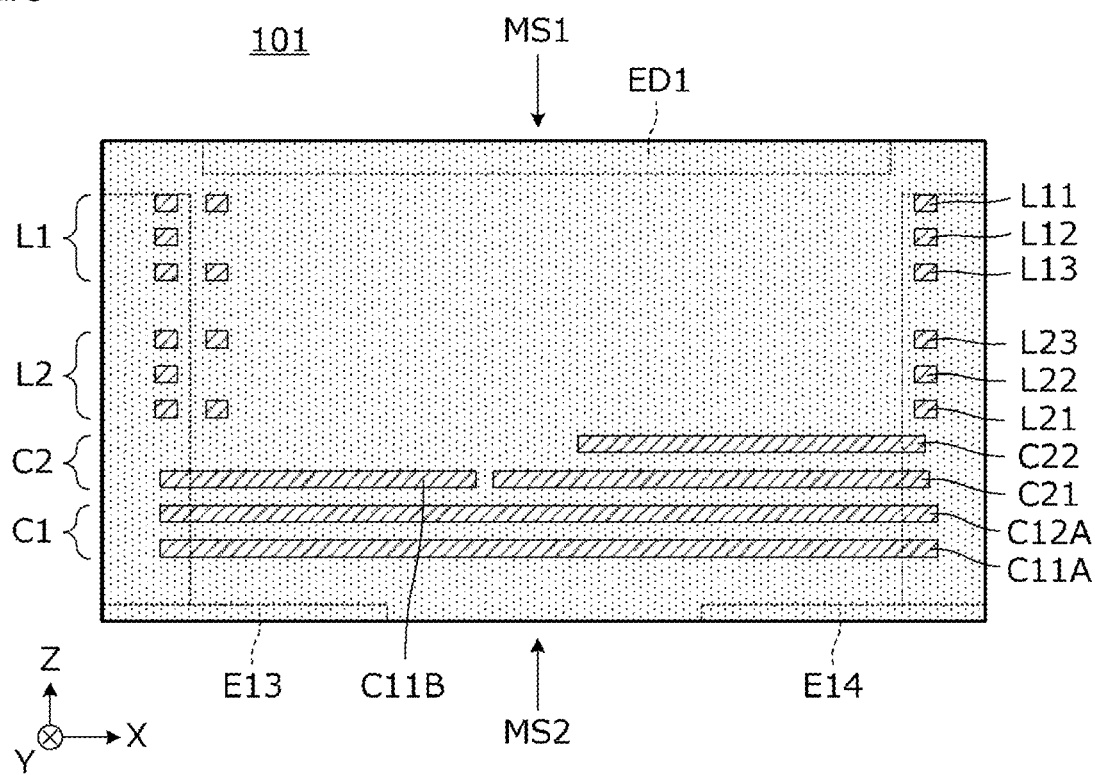
FIG. 3 is a cross-sectional view in a plane, parallel or substantially parallel to the X-Z plane, of the electronic component 101.

FIG. 2 is an exploded plan view illustrating conductive patterns provided on the insulating base layers of the electronic component 101. FIG. 3 is a cross-sectional view in a given plane, parallel or substantially parallel to the X-Z plane, of the electronic component 101. The long dashed short dashed lines in FIG. 2 indicate the position of the given plane.

A base layer S1 is the top base layer, and a base layer S14 is the bottom base layer. Base layers S2 to S13 are base layers between the top base layer S1 and the bottom base layer S14. The first terminal electrode E11, the second terminal electrode E12, the third terminal electrode E13, and the fourth terminal electrode E14 are provided on the base layer S14. Side terminal electrode portions E21, E22, E23, and E24 are provided on the base layers S2 to S13. Among the side terminal electrode portions E21, E22, E23, and E24 provided on the corresponding base layers, terminal electrode portions including the same reference character are in electrical communication with each other. The side terminal electrode E21 is in electrical communication with the first terminal electrode E11 provided on the base layer S14, the side terminal electrode E22 is in electrical communication with the second terminal electrode E12 provided on the base layer S14, the side terminal electrode E23 is in electrical communication with the third terminal electrode E13 provided on the base layer S14, the side terminal electrode E24 is in electrical communication with the fourth terminal electrode E14 provided on the base layer S14.

First coil conductors L11, L12, and L13 are provided on the base layers S2, S3, and S4, respectively. Second coil conductors L21, L22, and L23 are provided on the base layers S6, S7, and S8, respectively. The dashed lines in FIG. 2 indicate the relationship of connection using via conductors.

The first coil conductor L11 is connected, at its first end, to the side terminal electrode E21. A via conductor, which connects a second end of the first coil conductor L11 to a first end of the first coil conductor L12, is provided in the base layer S2. A via conductor, which connects a second end of the first coil conductor L12 to a first end of the first coil conductor L13, is provided in the base layer S3. The first coil conductor L13 is connected, at its second end, to the side terminal electrode E23. The first coil conductors L11, L12, and L13 and the via conductors, which are described above, define a first coil L1.

The second coil conductor L23 is connected, at its first end, to the side terminal electrode E23. A via conductor, which connects a second end of the second coil conductor L23 to a first end of the second coil conductor L22, is provided in the base layer S6. A via conductor, which connects a second end of the second coil conductor L22 to a first end of the second coil conductor L21, is provided in the base layer S7. The second coil conductor L21 is connected, at its second end, to the side terminal electrode E22. The second coil conductors L21, L22, and L23 and the via conductors, which are described above, define a second coil L2.

When viewed in the direction parallel or substantially parallel to the Z axis, the coil opening of the first coil conductors L11, L12, and L13 overlies that of the second coil conductors L21, L22, and L23 (the winding axes match each other). Thus, the first coil L1 is magnetically coupled to the second coil L2.

Second capacitor electrodes C22 and C21 are provided on the base layers S9 and S10, respectively. The second capacitor electrodes C22 and C21 define a second capacitor C2.

A first capacitor electrode C12B is provided on the base layer S9. A first capacitor electrode C11B is provided on the base layer S10. A first capacitor electrode C12A is provided on the base layer S11. A first capacitor electrode C11A is provided on the base layer S12. The first capacitor electrodes C12B, C11B, C12A, and C11A define a first capacitor C1.

The dummy electrodes ED1 and ED2 are provided on the base layer S1. The dummy electrodes ED1 and ED2 are not connected to the terminal electrodes E11, E12, E13, and E14, and extend along the long sides of the multilayer body 1. The direction identifying mark MD is provided on the base layer S1.

The coil conductors L11, L12, L13, L23, L22, and L21 are closer to the first principal surface MS1 than the capacitor electrodes C12B, C22, CHB, C21, C12A, and C11A in the stacking direction of the base layers S1 to S14. In other words, the capacitor electrodes C12B, C22, CHB, C21, C12A, and C11A are closer to the second principal surface MS2 than the coil conductors L11, L12, L13, L23, L22, and L21 in the stacking direction of the base layers S1 to S14.

When viewed in the stacking direction of the base layers S1 to S14, the dummy electrodes ED1 and ED2 do not overlap the coil opening of the coil conductors L11, L12, L13, L23, L22, and L21.

The base layers S1 to S14 of the multilayer body 1 are formed, for example, through screen printing using a photosensitive insulating paste and a photosensitive conductive paste, exposure to light, and developing. The multilayer body 1 is formed, for example, by stacking the base layers.

Specifically, for example, a photosensitive insulating paste layer is screen printed, ultraviolet light is radiated, and developing is performed using an alkaline solution. Thus, insulating base patterns, including openings for external electrodes, via holes, and the like, are formed. In addition, for example, screen printing is performed by using a photosensitive conductive paste, ultraviolet light is radiated, and developing is performed using an alkaline solution. Thus, conductive patterns are formed. A mother multilayer body is obtained by stacking the insulating base patterns and the conductive patterns. After that, a large number of multilayer bodies 1 are obtained by cutting the mother multilayer body into pieces. To improve the solderability, the conductivity, and the environment resistance, for example, Ni/Au plating is performed on the surfaces of the external electrodes.

The method of forming the multilayer body 1 is not limited to the above-described example method. For example, a method of performing printing with a conductive paste using screen plates including openings according to conductive pattern shapes and performing stacking may be used. The method of forming external electrodes is not limited to the above-described example method. For example, external electrodes may be formed on the bottom surface and the side surfaces of the multilayer body 1 by performing a dipping method or a sputtering method using a conductive paste on a stacked body. Further, plating may be performed on the surfaces of the external electrodes.

Figure 4A:
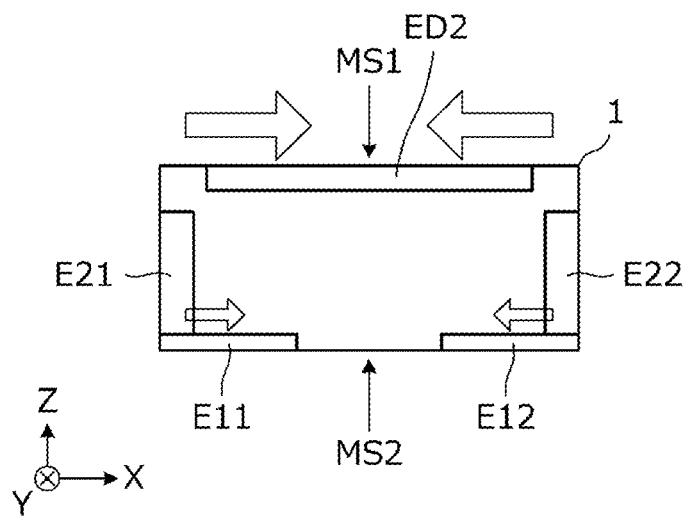
FIGS. 4A and 4B are front views illustrating stresses caused by shrinkage of the base layers in firing of a multilayer body 1 according to a preferred embodiment of the present invention.
Figure 4B:
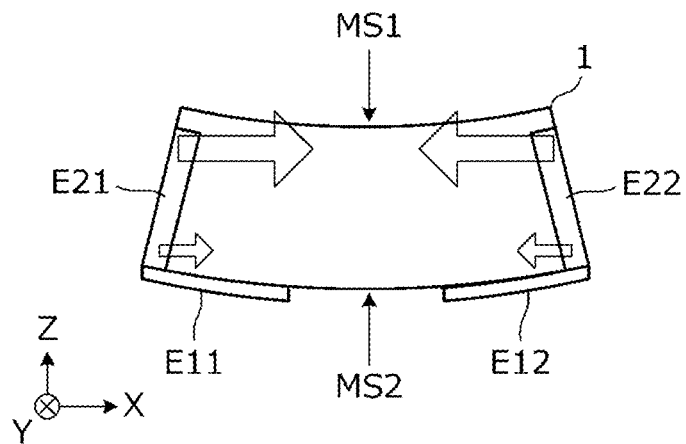

FIGS. 4A and 4B are front views illustrating stresses caused by shrinkage of the base layers during firing of the multilayer body 1. FIG. 4A is a diagram illustrating warpage of the multilayer body 1 according to the present preferred embodiment. FIG. 4B is a diagram illustrating warpage of the multilayer body 1 as a comparison example.

As illustrated in FIG. 3, the coil conductors L11, L12, L13, L23, L22, and L21 are positioned closer to the first principal surface MS1, and the capacitor electrodes C12B, C22, C11B, C21, C12A, and C11A are positioned closer to the second principal surface MS2. Thus, the conductor density on the first principal surface MS1 side is "sparse", and the conductor density on the second principal surface MS2 side is "dense". Therefore, the shrinkage ratio of the multilayer body 1, which is caused by firing of the multilayer body 1, is larger for the first principal surface MS1 than for the second principal surface MS2. Therefore, as illustrated in FIG. 4B, the fired multilayer body 1 tends to warp in the direction toward the first principal surface MS1.

In contrast, according to the present preferred embodiment, the dummy electrodes ED1 and ED2 are provided on the first principal surface MS1 of the multilayer body 1. Thus, the balance of conductor density between an area close to the first principal surface MS1 and an area close to the second principal surface MS2 of the multilayer body 1 is improved. In addition, the dummy electrodes ED1 and ED2 act as strut members during shrinkage of the multilayer body 1. Therefore, the warpage of the multilayer body 1 is reduced or prevented.

Figure 5:
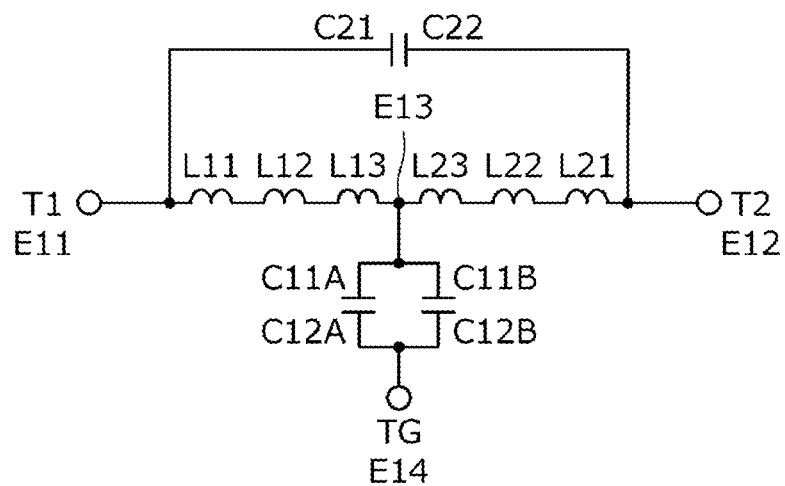
FIG. 5 is a circuit diagram of the electronic component 101, which clearly illustrates a correspondence between the conductive patterns and the electrodes illustrated in FIG. 2.

FIG. 5 is a circuit diagram of the electronic component 101, which clearly illustrates the correspondence between the conductive patterns and the electrodes illustrated in FIG. 2. A first terminal T1 illustrated in FIG. 5 corresponds to the first terminal electrode E11, a second terminal T2 corresponds to the second terminal electrode E12, and a reference potential terminal TG corresponds to the fourth terminal electrode E14.

Figure 6A:
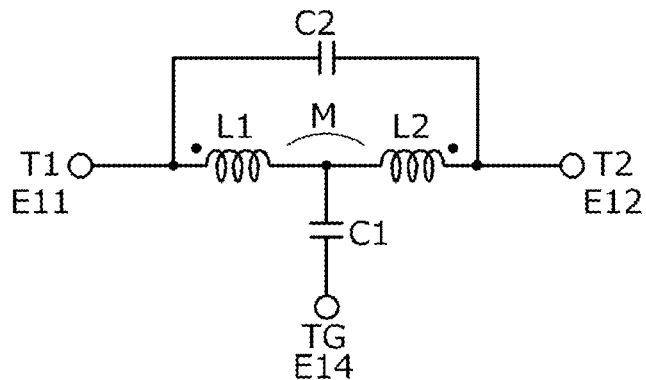
FIG. 6A is a circuit diagram of the electronic component 101.
Figure 6B:
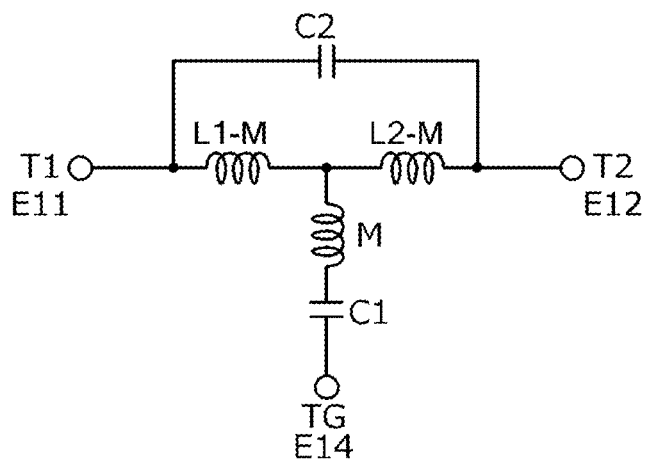
FIG. 6B is an equivalent circuit diagram of the electronic component 101.

FIG. 6A is a circuit diagram of the electronic component 101. FIG. 6B is an equivalent circuit diagram of the electronic component 101. FIG. 6A illustrates a T-shape LC filter including the first coil L1 and the second coil L2, which are connected in series, and the capacitor C1, which is connected in shunt.

The first coil L1 include the first coil conductors L11, L12, and L13 illustrated in FIG. 5, and the second coil L2 includes the second coil conductors L21, L22, and L23. The first capacitor C1 includes the capacitor electrodes C11A, C12A, C11B, and C12B, and the second capacitor C2 includes the capacitor electrodes C21 and C22.

In FIGS. 5, 6A, and 6B, the electronic component 101 circuit acts as a filter circuit in which the reference potential terminal TG is connected to the reference potential (ground potential) and in which unbalanced signals are input/output to/from the first terminal T1 and the second terminal T2. Circuits having, for example, an impedance of about 50Ω are connected to the first terminal T1 and the second terminal T2.

The first coil L1 and the second coil L2 illustrated in FIG. 6A include the winding axis in the stacking direction of the base layers, and the coil openings, which overlie each other, cause magnetic field coupling to occur. The first coil L1 and the second coil L2, whose winding directions are opposite to each other, are connected in series. As illustrated in FIG. 6B, the inductances of the two series-connected devices are (L1−M) and (L2−M), and the inductance of the shunt connected device is M, where the inductance of the first coil L1 is represented by L1, the inductance of the second coil L2 is represented by L2, and the mutual inductance caused by coupling between the first coil L1 and the second coil L2 is represented by M. The LC series circuit, which includes the inductance M and the first capacitor C1 which are connected in shunt, forms a first attenuation pole.

In FIG. 6B, the inductance of the series circuit including the first coil L1 and the second coil L2, which are magnetically coupled to each other, is (L1−M)+(L2−M)=L1+L2−2M. An LC parallel circuit, which includes the series circuit and the second capacitor C2, defines a second attenuation pole.

Figure 7:
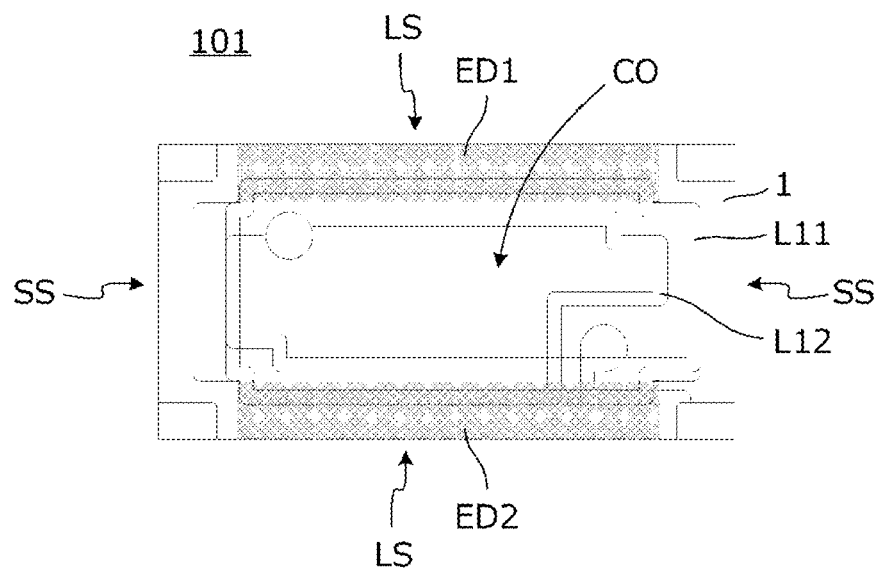
FIG. 7 is a plan view, illustrating areas to provide dummy electrodes ED1 and ED2 in the multilayer body 1, of the electronic component 101 according to the first preferred embodiment of the present invention.

FIG. 7 is a plan view, illustrating areas for the dummy electrodes ED1 and ED2 in the multilayer body 1, of the electronic component 101 according to the present preferred embodiment. In the example illustrated in FIG. 7, when viewed in the stacking direction of the base layers of the multilayer body 1, the dummy electrodes ED1 and ED2 extend along long sides LS. The dummy electrodes ED1 and ED2 do not overlap a coil opening CO of the coil conductors. The "coil opening" refers to an innermost coil opening among the coil openings of the first coil conductors L11, L12, and L13 and the second coil conductors L21, L22, and L23 illustrated in FIG. 2. In the example illustrated in FIG. 7, the dummy electrodes ED1 and ED2 overlap the first coil conductor L11 partially, but do not overlap the first coil conductor L12.

Figure 8A:
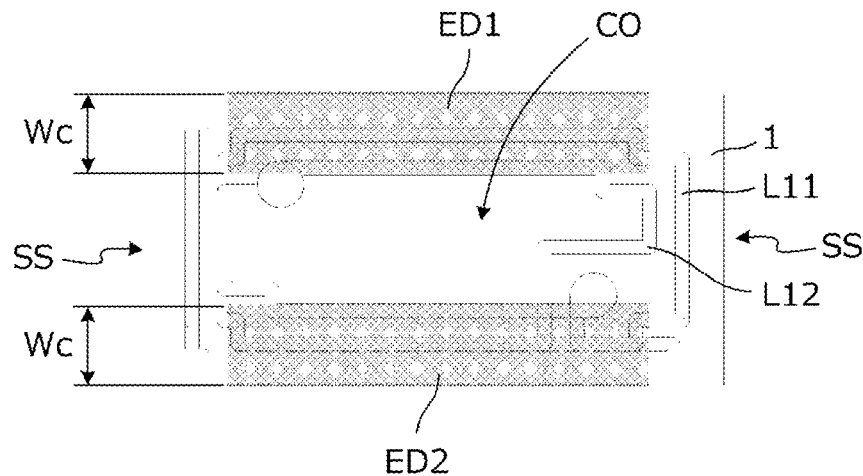
FIGS. 8A to 8C are plan views, illustrating other exemplary areas to provide the dummy electrodes ED1 and ED2 in the multilayer body 1, of the electronic component 101 according to the first preferred embodiment of the present invention.
Figure 8B:
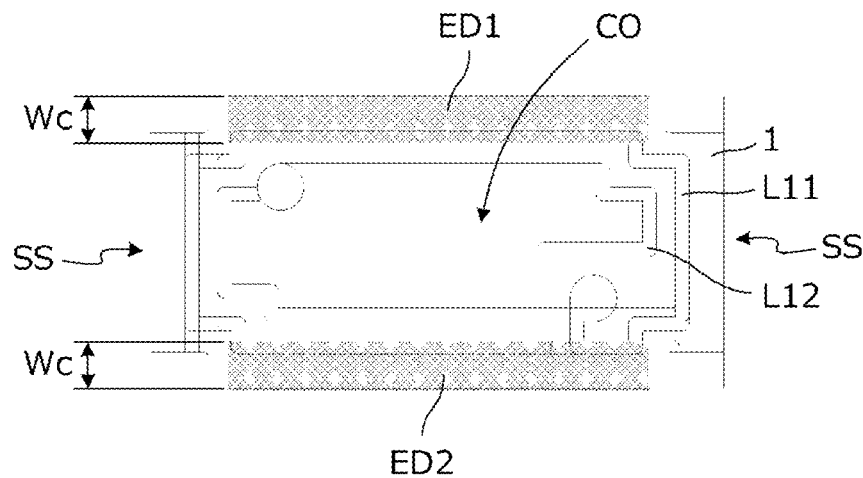
Figure 8C:
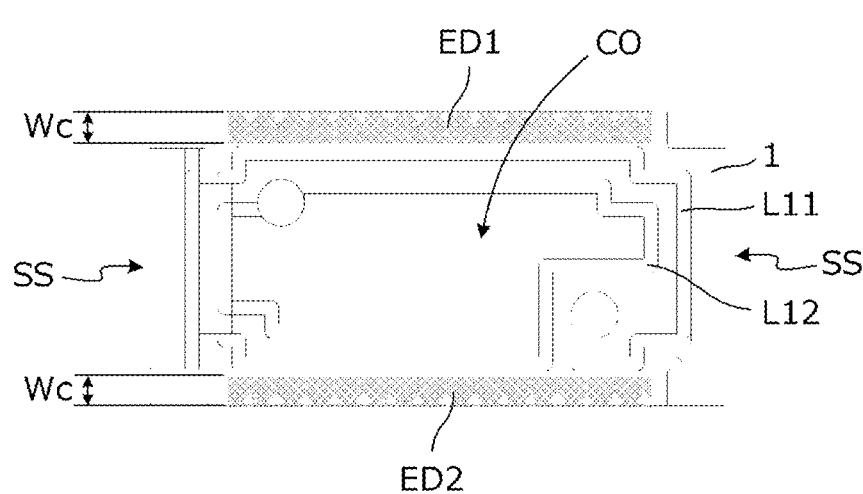

FIGS. 8A to 8C are plan views, illustrating other exemplary areas for the dummy electrodes ED1 and ED2 in the multilayer body 1, of the electronic component 101 according to the first preferred embodiment. FIG. 8A illustrates an example in which the width Wc, in the short side SS direction, of the dummy electrodes ED1 and ED2 extends wide to the edge of the coil opening CO. That is, the width Wc of the dummy electrodes ED1 and ED2 is wide to the position at which the dummy electrodes ED1 and ED2 are in contact with the coil opening CO of the innermost coil conductor L12 among the coil openings CO of the coil conductors. FIG. 8B illustrates an example in which the width Wc, in the short side SS direction, of the dummy electrodes ED1 and ED2 is set to a width such that the dummy electrodes ED1 and ED2 are in contact with the inner edge of the outermost coil conductor L11 among the coil conductors. FIG. 8C illustrates an example in which the width Wc, in the short side SS direction, of the dummy electrodes ED1 and ED2 is set to a width such that the dummy electrodes ED1 and ED2 are not in contact with the outer edge of the outermost coil conductor L11 among the coil conductors.

According to the present preferred embodiment, the balance of conductor density between an area closer to the first principal surface and an area closer to the second principal surface in the multilayer body 1 is improved. In addition, the dummy electrodes ED1 and ED2 act as strut members during shrinkage of the multilayer body 1. Further, the dummy electrodes ED1 and ED2 do not block the coil opening CO of the coil conductors. Therefore, an electronic component is obtained which reduces or prevents warpage of the multilayer body 1 and which reduces or prevents degradation of the Q values of the inductors.

Second Preferred Embodiment

A second preferred embodiment of the present invention describes an exemplary electronic component including multiple conductive patterns along the long sides of the multilayer body.

Figure 9A:
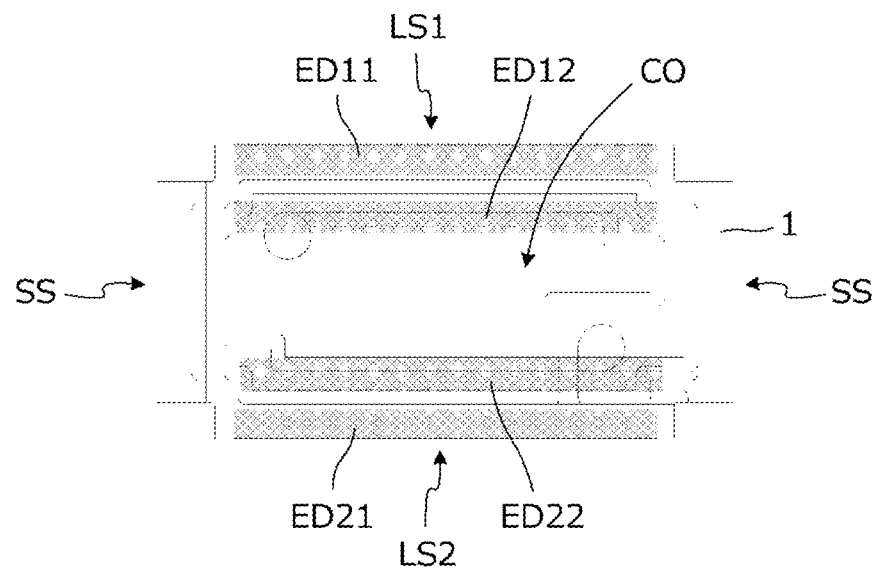
FIGS. 9A and 9B are plan views, illustrating areas to provide the dummy electrodes ED1 and ED2 in a multilayer body 1, of an electronic component according to a second preferred embodiment of the present invention.
Figure 9B:
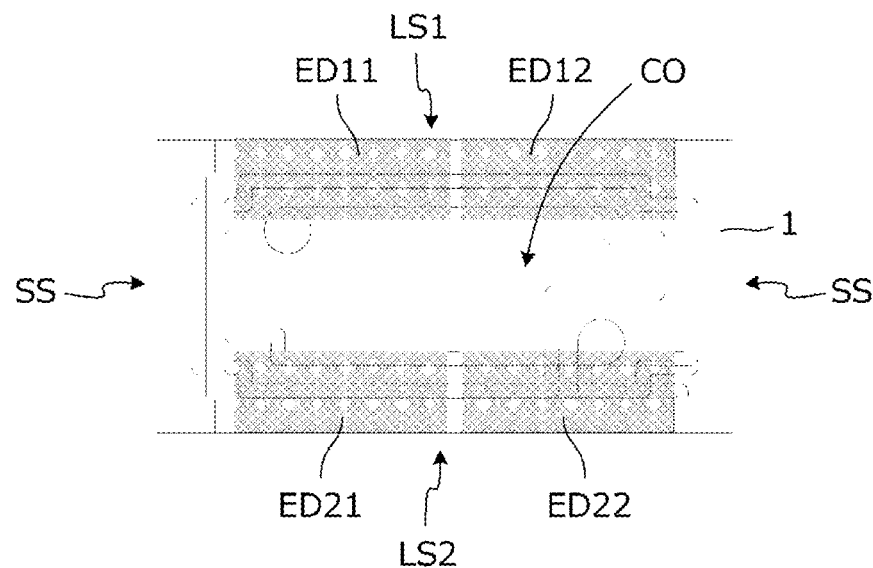

FIGS. 9A and 9B are plan views, illustrating areas for the dummy electrodes ED1 and ED2 in the multilayer body 1, of an electronic component according to the second preferred embodiment. In the example illustrated in FIG. 9A, two dummy electrodes ED11 and ED12 are provided along a first long side LS1 of the multilayer body 1, and two dummy electrodes ED21 and ED22 are provided along a second long side LS2 of the multilayer body 1. In the example illustrated in FIG. 9B, the two dummy electrodes ED11 and ED12 separated in the first long side LS1 direction of the multilayer body 1 are provided, and the two dummy electrodes ED21 and ED22 separated in the second long side LS2 direction of the multilayer body 1 are provided.

In the examples illustrated in FIGS. 9A and 9B, two dummy electrodes are provided along each of the first long side LS1 and the second long side LS2. More than two dummy electrodes may be provided.

As in the example illustrated in FIG. 9A, as long as the dummy electrodes ED11, ED12, ED21, and ED22 are continuously provided along the long sides of the multilayer body 1, the dummy electrodes ED11, ED12, ED21, and ED22 act as strut members more effectively during shrinkage caused by firing of the multilayer body 1.

Figure 10:
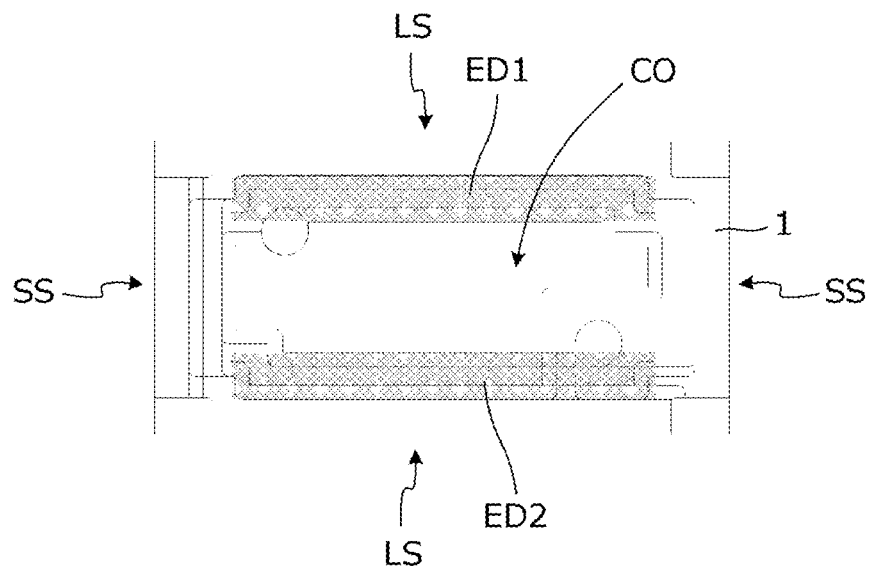
FIG. 10 is a plan view, illustrating areas to provide the dummy electrodes ED1 and ED2 in the multilayer body 1, of another electronic component according to the second preferred embodiment of the present invention.

FIG. 10 is a plan view, illustrating areas for the dummy electrodes ED1 and ED2 in the multilayer body 1, of another electronic component according to the second preferred embodiment. In this example, the dummy electrodes ED1 and ED2 are provided in a range in which the dummy electrodes ED1 and ED2 do not extend to (are not in contact with) the long sides of the multilayer body 1. However, the dummy electrodes ED1 and ED2 are provided on the outside of the coil opening CO. Thus, the dummy electrodes ED1 and ED2 may have a shape in which the dummy electrodes ED1 and ED2 do not extend to the edges of the multilayer body 1.

Figure 11:
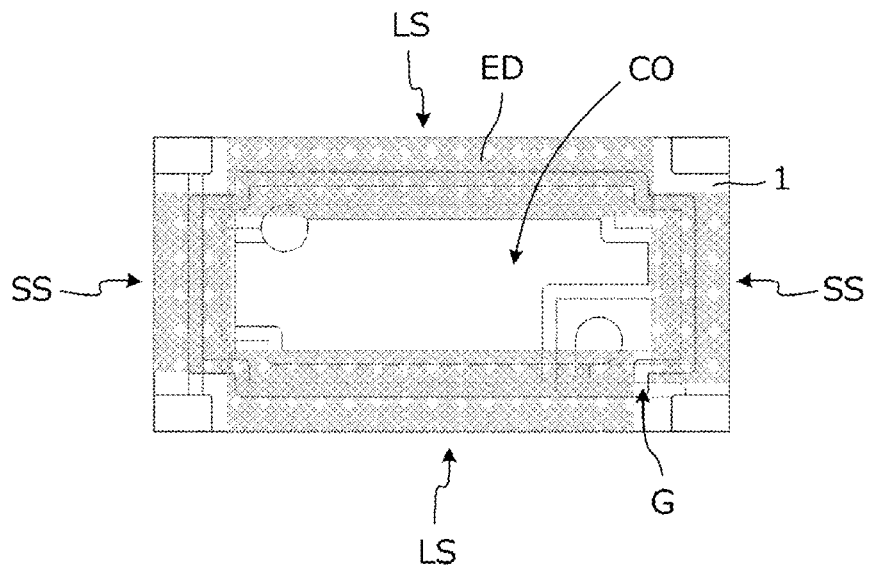
FIG. 11 is a plan view, illustrating an area to provide a dummy electrode ED in the multilayer body 1, of another electronic component according to the second preferred embodiment of the present invention.

FIG. 11 is a plan view, illustrating an area for a dummy electrode ED in the multilayer body 1, of another electronic component according to the second preferred embodiment. In this example, the dummy electrode ED is continuously provided along the contour of the multilayer body 1 in an area in which the dummy electrode ED does not overlap the coil opening CO. However, a gap G is provided so that a loop, which extends around the coil opening CO, is not provided. The dummy electrode ED does not define a closed loop. Thus, there is no shielding of magnetic flux caused by flow of eddy current, and a reduction of the inductance may be avoided.

Thus, the dummy electrode ED may include portions along the short sides SS of the multilayer body 1. In addition, dummy electrodes provided along the long sides LS and the dummy electrodes provided along the short sides SS may be continuously provided.

Third Preferred Embodiment

A third preferred embodiment of the present invention describes an electronic component in which the position of the layer, on which the dummy electrodes are provided, in the multilayer body is different from that in the example illustrated in the first preferred embodiment.

Figure 12:
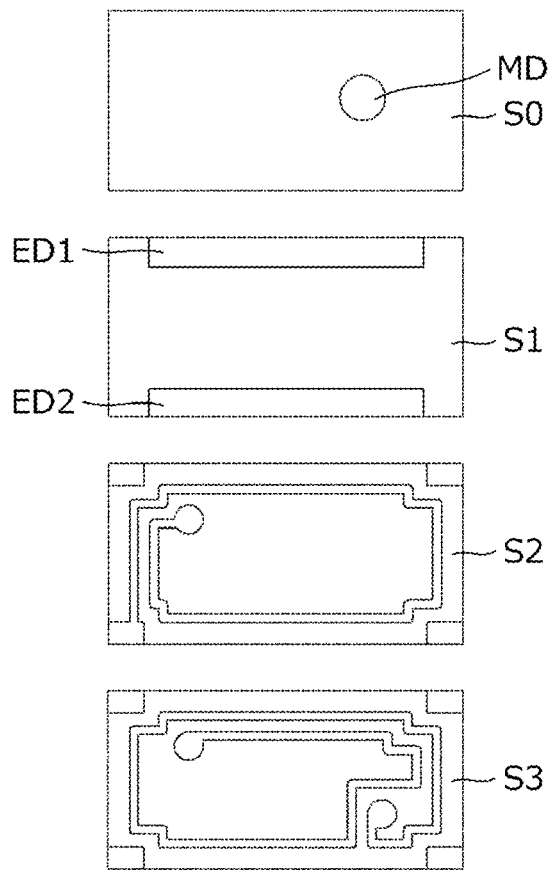
FIG. 12 is an exploded plan view illustrating conductive patterns on the insulating base layers of an electronic component according to a third preferred embodiment of the present invention.

FIG. 12 is an exploded plan view illustrating conductive patterns provided on the insulating base layers of the electronic component according to the third preferred embodiment. A base layer S0 is the top base layer, and the base layer S14 is the bottom base layer. The base layers S1 to S13 are base layers between the top base layer S0 and the bottom base layer S14. In the example illustrated in FIG. 2 in the first preferred embodiment, the dummy electrodes ED1 and ED2 are provided on the top base layer S1. In contrast, in the third preferred embodiment, the dummy electrodes ED1 and ED2 are provided on the base layer S1 which is an inner base layer than the top base layer S0. The remaining configuration is the same or substantially the same as that in the first preferred embodiment.

Also in the electronic component according to the present preferred embodiment, the coil conductors are closer to the first principal surface than the capacitor electrodes in the stacking direction of the base layers. Therefore, the dummy electrodes ED1 and ED2, which are closer to the first principal surface than the coil conductors in the stacking direction of the base layers, cause reduction or prevention of the warpage in firing of the multilayer body.

Thus, the dummy electrodes may be provided in an inner layer of the multilayer body.

Fourth Preferred Embodiment

A fourth preferred embodiment of the present invention describes an electronic component including electrodes whose shapes viewed from the inside and the outside of the multilayer body are different from those in the example in the first preferred embodiment.

Figure 13:
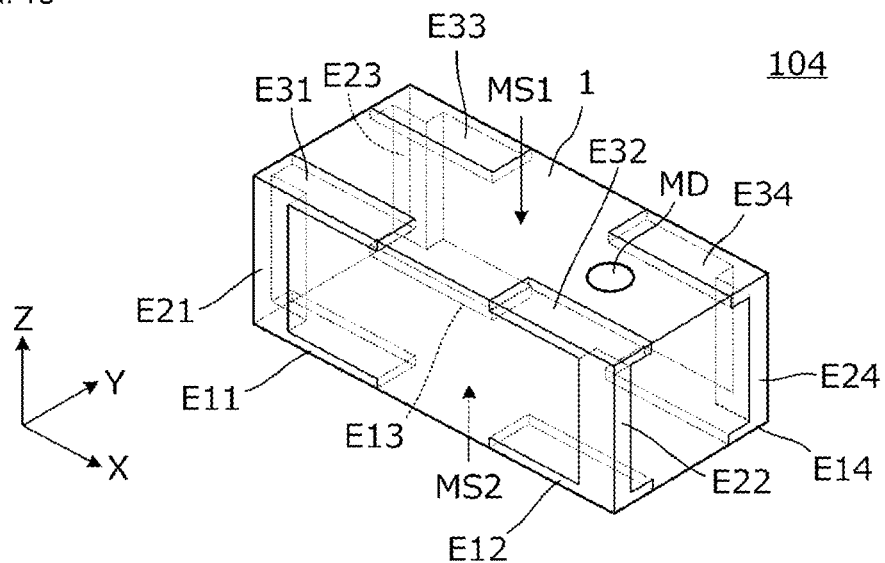
FIG. 13 is a perspective view of an electronic component 104 according to a fourth preferred embodiment of the present invention.

FIG. 13 is a perspective view of an electronic component 104 according to the fourth preferred embodiment. The electronic component 104 includes the multilayer body 1 which includes the first principal surface MS1 and the second principal surface MS2, which are opposite to each other in the stacking direction of the base layers, and which has a rectangular or substantially rectangular parallelepiped shape in which the first principal surface MS1 and the second principal surface MS2 include long sides and short sides. In FIG. 13, the direction parallel or substantially parallel to the Z axis is the stacking direction; the direction parallel or substantially parallel to the X axis is the long side direction; the direction parallel or substantially parallel to the Y axis is the short side direction.

The multilayer body 1 includes, therein, capacitor electrodes defining capacitors, and coil conductors defining inductors and including a winding axis parallel or substantially parallel to the stacking direction of the multilayer body 1. These are not illustrated in FIG. 13.

The first terminal electrode E11, the second terminal electrode E12, the third terminal electrode E13, and the fourth terminal electrode E14, which are connected to the coil conductors and the capacitor electrodes, are disposed on the second principal surface MS2 of the multilayer body 1. Terminal electrodes E31, E32, E33, and E34, which are connected to the terminal electrodes E11, E12, E13, and E14, respectively, are disposed on the first principal surface MS1 of the multilayer body 1. The direction identifying mark MD is provided on the first principal surface MS1 of the multilayer body 1.

Figure 14:
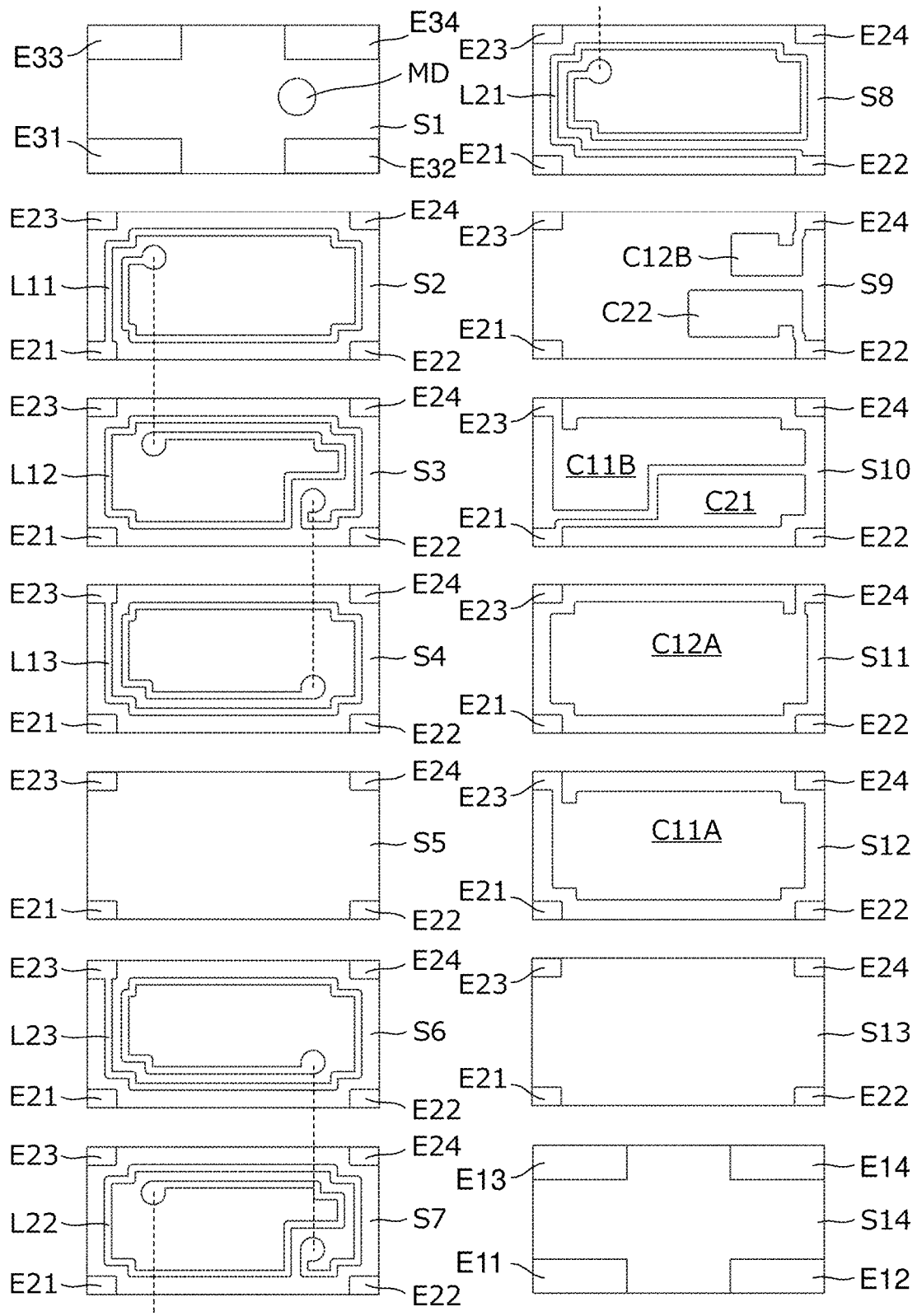
FIG. 14 is an exploded plan view illustrating conductive patterns on the insulating base layers of the electronic component 104 according to the fourth preferred embodiment of the present invention.

FIG. 14 is an exploded plan view illustrating conductive patterns provided on the insulating base layers of the electronic component 104.

The base layer S1 is the top base layer, and the base layer S14 is the bottom base layer. The base layers S2 to S13 are base layers between the top base layer S1 and the bottom base layer S14.

The side terminal electrode portions E21, E22, E23, and E24 are provided on the base layers S2 to S13. Among the side terminal electrode portions E21, E22, E23, and E24 provided on the corresponding base layers, terminal electrode portions having an identical reference character are in electrical communication with each other.

The electrode pattern provided on the top base layer S1 is different from that of the electronic component 101 according to the first preferred embodiment illustrated in FIGS. 1 and 2. The first terminal electrode E31, the second terminal electrode E32, the third terminal electrode E33, and the fourth terminal electrode E34 are provided on the base layer S1. The first terminal electrode E11, the second terminal electrode E12, the third terminal electrode E13, and the fourth terminal electrode E14 are provided on the base layer S14. The other electrodes are the same or substantially the same as those of the electronic component 101 according to the first preferred embodiment.

The side terminal electrode E21 is in electrical communication with the first terminal electrode E31 provided on the base layer S1 and the first terminal electrode E11 provided on the base layer S14, and the side terminal electrode E22 is in electrical communication with the second terminal electrode E32 provided on the base layer S1 and the second terminal electrode E12 provided on the base layer S14. Similarly, the side terminal electrode E23 is in electrical communication with the third terminal electrode E13 provided on the base layer S1 and the third terminal electrode E33 provided on the base layer S14, and the side terminal electrode E24 is in electrical communication with the fourth terminal electrode E14 provided on the base layer S1 and the fourth terminal electrode E34 provided on the base layer S14.

Therefore, the first terminal electrode E31, the second terminal electrode E32, the third terminal electrode E33, and the fourth terminal electrode E34, which are provided on the top base layer S1, are also in electrical communication with the side terminal electrodes E21, E22, E23, and E24, respectively, which are provided in the base layers S2 to S13.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
   a multilayer body including a first principal surface and a second principal surface opposite to each other in a stacking direction of base layers, and having a rectangular or substantially rectangular parallelepiped shape in which the first principal surface and the second principal surface include a long side and a short side;
   capacitor electrodes defining a capacitor;
   coil conductors including a winding axis parallel or substantially parallel to the stacking direction and defining at least one inductor;
   terminal electrodes connected to the coil conductors and the capacitor electrodes; and
   at least one dummy electrode not connected to the terminal electrodes and extending along the long side of the multilayer body; wherein
   the coil conductors are closer to the first principal surface than the capacitor electrodes in the stacking direction;
   the at least one dummy electrode is closer to the first principal surface than the coil conductors in the stacking direction; and
   the at least one dummy electrode does not overlap a coil opening of the coil conductors when viewed in the stacking direction.

2. The electronic component according to claim 1, wherein the terminal electrodes are exposed on the second principal surface.

3. The electronic component according to claim 1, wherein the at least one dummy electrode is on the first principal surface.

4. The electronic component according to claim 1, wherein
the at least one dummy electrode includes a plurality of dummy electrodes; and
each of the plurality of dummy electrodes includes a conductive pattern.

5. The electronic component according to claim 4, wherein the plurality of dummy electrodes extend along a first long side and a second long side, respectively, of the first principal surface, the first long side being opposite to the second long side.

6. The electronic component according to claim 5, wherein the plurality of dummy electrodes include a plurality of conductive patterns extending along the first long side, and a plurality of conductive patterns extending along the second long side.

7. The electronic component according to claim 1, wherein the at least one dummy electrode overlaps the coil conductors when viewed in the stacking direction.

8. The electronic component according to claim 1, wherein the inductor and the capacitor define an LC filter.

9. The electronic component according to claim 1, wherein the terminal electrodes include first, second, third, and fourth terminal electrodes on the second principal surface.

10. The electronic component according to claim 1, wherein a direction identifying mark is provided on the first principal surface.

11. The electronic component according to claim 1, wherein ends of the coil conductors are connected to one another by a via conductor.

12. The electronic component according to claim 1, further comprising side terminal electrodes in electrical communication with respective ones of the terminal electrodes.

13. The electronic component according to claim 1, wherein the at least one inductor includes a first inductor and a second inductor that are magnetically coupled to one another.

14. The electronic component according to claim 13, wherein the first and second inductors are connected in series with one another and the capacitor is connected in shunt to the first and second inductors.

* * * * *